US009623950B2

(12) United States Patent
Fink et al.

(10) Patent No.: US 9,623,950 B2
(45) Date of Patent: Apr. 18, 2017

(54) FUSELAGE AIRFRAME (71) Applicant: AIRBUS HELICOPTERS DEUTSCHLAND GMBH, Donauworth (DE)

(72) Inventors: Axel Fink, Donauworth (DE); Andreas Rack, Burghausen (DE); Philipp Hoefer, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 336 days.

(21) Appl. No.: 14/613,685

(22) Filed: Feb. 4, 2015

(65) Prior Publication Data
US 2015/0307178 A1    Oct. 29, 2015

(30) Foreign Application Priority Data

Feb. 6, 2014 (EP) .................................. 14400007

(51) Int. Cl.
*B64D 37/06* (2006.01)
*B64C 1/06* (2006.01)
(Continued)

(52) U.S. Cl.
CPC ............... *B64C 1/061* (2013.01); *B64C 1/062* (2013.01); *B64D 37/04* (2013.01); *B64D 37/06* (2013.01); *B64C 27/04* (2013.01); *Y02T 50/44* (2013.01)

(58) Field of Classification Search
CPC .......... B64C 1/061; B64C 27/04; B64D 37/06
(Continued)

(56) References Cited

U.S. PATENT DOCUMENTS 1,781,446 A * 11/1930 Dornier .................. B64C 35/00
                                                  123/1 R
2,604,280 A *  7/1952 Benoit ................... B64C 1/061
                                                  105/396
(Continued)

FOREIGN PATENT DOCUMENTS

EP    1426289    6/2004
FR    2756255    5/1998
FR    2903961    1/2008

OTHER PUBLICATIONS

Extended European Search Report for European Application No. 14400007.2, Completed by the European Patent Office, Dated Jul. 9, 2014, 6 Pages.

*Primary Examiner* — Brian M O'Hara
*Assistant Examiner* — Keith L Dixon
(74) *Attorney, Agent, or Firm* — Brooks Kushman P.C.

(57) ABSTRACT

A fuel tank and a differential frame in a fuselage airframe of a helicopter, the fuel tank being installed between the fuselage lower cover shell and the floor panel. The differential frame separates the fuel tank into two individual compartments, the differential frame having a web below the floor panel with a variable-height with a minimum height at the symmetry axis of the fuselage cross-section and a maximum height at lateral frame roots regions. A transversal beam is attached at each of its both ends to the differential frame bridging the entire variable-height of the differential frame and the fuel tank with two front and rear fuel bladders covering both individual tank compartments with a middle bladder installed between the transversal beam and the variable-height web of the differential frame.

15 Claims, 4 Drawing Sheets (51) Int. Cl.
*B64D 37/04* (2006.01)
*B64C 27/04* (2006.01)

(58) Field of Classification Search
USPC .............................................. 244/119, 135 B
See application file for complete search history.

(56) References Cited

U.S. PATENT DOCUMENTS

| | | | |
|---|---|---|---|
| 3,966,147 A * | 6/1976 | Wittko | B64D 37/04 220/905 |
| 4,531,695 A * | 7/1985 | Swinfield | B64C 1/068 244/119 |
| 4,860,972 A | 8/1989 | Lannerd et al. | |
| 5,024,399 A * | 6/1991 | Barquet | B29C 70/44 244/119 |
| 5,371,935 A | 12/1994 | Furs et al. | |
| 5,451,015 A | 9/1995 | Cronkhite et al. | |
| 6,019,316 A * | 2/2000 | Sarlin | B64C 1/062 244/135 B |
| 6,439,506 B1 | 8/2002 | Schlegel et al. | |
| 7,357,149 B2 * | 4/2008 | Howe | B64D 37/04 137/266 |
| 7,874,516 B2 * | 1/2011 | Cacciaguerra | B64C 1/061 244/119 |
| 7,984,877 B2 * | 7/2011 | Hasmann | B64D 37/06 137/312 |
| 8,047,465 B2 * | 11/2011 | Payen | B64C 1/062 244/119 |
| 8,905,351 B2 * | 12/2014 | Buscher | B64C 39/024 244/118.1 |
| 8,960,603 B2 * | 2/2015 | Santolalla | B64C 1/061 244/119 |
| 2012/0061513 A1 | 3/2012 | Gallant et al. | |
| 2013/0214095 A1 | 8/2013 | Bofill | |

* cited by examiner

FUSELAGE AIRFRAME

CROSS REFERENCE TO RELATED APPLICATION

This application claims priority to European patent application No. EP 14 400007.2 filed on Feb. 6, 2014, the disclosure of which is incorporated in its entirety by reference herein.

BACKGROUND OF THE INVENTION (1) Field of the Invention

The invention relates to a fuselage airframe for a specific fuel tank design of a helicopter with the features of the preamble of claim 1. The invention relates as well to the fuel tank design specific to the fuselage airframe of the helicopter with the features of the preamble of claim 7 and to a specific integration procedure for this fuel tank with the features of the preamble of claim 9.

(2) Description of Related Art

A typical integration of a fuel tank below a floor panel, within a typical airframe of e.g. a helicopter is characterized by the following difficulties:

Continuous frames and/or longerons of a typical airframe, covering the entire cross section of a subfloor compartment below the floor panel of said typical airframe, enforce to divide the subfloor compartment into several individual cells. This requires the use of several individual fuel bladders which have to be interconnected to each other by means of special fuel system devices such as transfer pipes for fuel transfer between two adjacent fuel bladders and scavenge lines for fuel transfer from e.g. main tanks to feeder tanks. These special fuel system devices have to be conducted through these structural elements, i.e. the frames and/or longerons, so the frames and/or longerons have to be provided with suitable cut-outs. Since the fuel bladders' integration is accomplished after the structural airframe assembly, considerable integration efforts have to be made in terms of installing the fuel systems and connecting the corresponding fuel bladders.

Once the whole fuel system of fuel bladders and fuel system devices is installed within the airframe, the fuel system has to be tested in its final integration condition within the airframe, leading to large disadvantages in the final assembly, since the test process delays further structural integration processes and causes time consuming defect detection procedures as well as large disassembly and reassembly efforts for defect remedy. The same applies for maintenance operations of the fuel tank.

Drilling operations in the fuel tank area represent a serious risk of damaging the fuel bladders. Drilling operations affecting the fuel tank's compartments are hence strictly avoided. This requirement sets considerable limitations in the structural design with respect to alternative fuel tank integration approaches.

The fuel tanks of typical helicopters are allocated within the subfloor compartment of a fuselage center section between a floor panel and a fuselage lower cover. The fuel tanks are composed of several cells each enclosing individual fuel bladders of reinforced elastomeric material. Each cell is housed and supported by the surrounding structural elements: frames, floor panels, lower cover shell and longerons. The fuel tanks are separated into main tanks and feeder tanks, the main tanks supplying the feeder tanks and the feeder tanks supplying directly the engines. The bottom of each cell compartment is provided with foam inserts which are specially shaped in order to ensure an adequate fuel extraction at each flight condition.

The fuel tank integration procedure is complex. After the structural assembly the floor panel has to be removed, the individual fuel bladders are mounted within the subfloor structure, connected to each other and subsequently the floor panel has to be reinstalled. Especial care has to be paid to a leakage-free installation of the fuel transfer lines.

The structural elements determining most of all the fuel system compartment design are the frames and longitudinal members such as longerons. The frames are transversal elements enclosing the entire perimeter of the load carrying fuselage, hence ranging from its upper deck to the lower cover shell. The longerons are longitudinal elements being basically arranged along the longitudinal axis of the aircraft and spanning the entire length of the subfloor structure.

The frames are key elements of the structural architecture of the helicopter supporting the upper deck systems, e.g. engines, gear box, . . . , introducing loads, e.g. inertia loads, rotor loads, fuel loads, crash loads, landing gear loads, payload loads, ditching loads . . . , supporting and stabilizing peripheral structural elements, e.g. longerons, shells, beams, stringers if present, and providing for energy dissipation in crash scenarios. The frame is composed of an essentially planar web essentially perpendicular to the longitudinal axis and flanges extending along inner and outer contour perimeters of the web essentially perpendicular to the web's plane.

The frame comprises an upper section above the floor plane with two lateral essentially vertical portions and an upper essentially horizontal portion at the airframe deck, and a lower section with the web and its two contouring flanges below the floor plane. The cabin compartment is confined between the inner perimeter of the frame's upper section and the floor panel.

The design of the upper section of the frames is mainly driven by stiffness and strength requirements, the latter being essentially set by very demanding crash scenarios with their associated large load factors, e.g. large inertia loads excited by significant upper deck masses such as gear box and engines. The lower section of the frames below the floor plane is essentially designed in view of the subfloor loads, e.g. payload and fuel for flight and ground load, said subfloor loads being considerably less than crash loads.

The lower section of the frames is further designed in view of the landing gear loads for some of the frames, as well as in terms of energy dissipation in case of crash, and most of all in charge for energy dissipation for a vertical crash scenario. In case of a crash, the horizontal subfloor frame portions hold the vertical lateral frame portions in place avoiding their entire separation from the airframe structure.

The web height of the lower section of the frame in the subfloor compartment is typically larger than the frame's web height of the frame's sections above the floor plane. Hence, strength and stiffness in the subfloor compartment of the frame are not very demanding, the critical locations being rather allocated within transitions between horizontal subfloor frame portions and the lateral frame portions above floor panel level. The transition region between the frame's upper section and the frame's lower section at floor plane level is called frame root region representing a critical area in terms of strength. At the transition region the inner cap's trajectory is strongly diverted between an essentially vertical and an essentially horizontal direction.

The document U.S. Pat. No. 5,451,015 (Bell) discloses a dual-purpose bulkhead structure to support normal aircraft operational loads and to absorb energy in a controlled manner during a crash. An integral fuel tank comprises a fuel compartment and a crashworthy flexible fuel cell. The fuel compartment includes two dual-purpose bulkheads and crushable foam disposed between the sides of the fuel cell and the bulkheads and sides of the fuel compartment. The foam limits fuel pressure loads on the fuel compartment bulkheads and sides during a crash, thereby preventing their failure. U.S. Pat. No. 5,451,015 further discloses a rigid anti-crash tank, forming an integral part of the structure of the equipment implying disadvantages with regard to structural flexibility.

The document U.S. Pat. No. 5,371,935 (United Technologies Corporation) discloses a method for removing a fuel cell from an aircraft fuselage cavity with the steps of: sealing the fuel cell by securing complementary covers and gaskets or O-rings in combination with the ports of the fuel cell, installing an evacuation system in combination with the fuel cell, operating the evacuation system to evacuate the sealed fuel cell wherein the ambient air pressure of the aircraft fuselage cavity collapses the fuel cell to a predetermined height, and removing the collapsed fuel cell from the aircraft fuselage cavity.

The document FR 2756255 (Eurocopter France) discloses a fuel tank with a suction opening with at least one filler for liquid outside the tank. A feed tank is fixed to the inside of the tank and is in communication with it so that the liquid contained in the tank can pass into the feed tank. The suction opening of the filler opens into the feed tank of which the volume is such that, when the tank is subjected to a negative or zero load factor or is turned over for a predetermined time, the suction opening is filled continuously by the liquid in the feed tank.

The document U.S. Pat. No. 4,860,972 (de Era Aviation) discloses an auxiliary tank under and not integrated in the helicopter.

The document U.S. Pat. No. 6,439,506 B1 describes a tank arrangement comprising two tanks, each of which having a breathing channel communicating with the atmosphere and being connecting with one another by means of an additional channel. The breathing channel of one of the two tanks is separated from the tank by a ventilation valve which in turn comprises a system of chambers, ports and shut-off devices that allow opening and closing the valve according to the level of fuel of the tank.

The document FR 2 903 961 A1 discloses an structural element having a cavity or depression on which an insert is mounted, the insert having a plurality of deformation notches distributed on a substantial portion of its surface.

BRIEF SUMMARY OF THE INVENTION

It is an object of the invention to provide an improved fuselage airframe for fuel tank integration concepts. It is a further object of the invention to provide an integration procedure for a fuel tank into the fuselage airframe with reduced process complexity inclusive the final assembly line. It is a still further object of the invention to provide a fuel tank suitable for integration into the fuselage airframe.

A solution is provided with a fuselage airframe with the features of claim 1 of the invention. A further solution is provided with an integration procedure for a fuel tank into the fuselage airframe with the features of claim 9 of the invention. A still further solution is provided with a fuel tank with the features of claim 7 of the invention.

According to the invention a fuselage airframe of a helicopter comprises a subfloor compartment encompassed by a concave cover shell, standard frames and a floor panel covering substantially entirely said subfloor compartment above the concave cover shell. At least one differential frame of the fuselage airframe is mounted to the concave cover shell between two standard frames. Said at least one differential frame is perpendicular and substantially symmetric with regard to a longitudinal axis of the fuselage cross-section.

The differential frame has a web contoured by flanges respectively in a lower section below the floor plane and in an upper section above the floor plane, the latter being composed of lateral essentially vertical portions and an upper essentially horizontal portion, similar to the upper section of standard frames. Said lower section of the at least one differential frame partitions the subfloor compartment into two individual cells provided between the concave cover shell, the adjacent standard frames and the floor panel for reception of a fuel tank.

The web of the lower section of the at least one differential frame has a variable-height with a minimum height at the longitudinal axis of the concave cover shell cross-section and a maximum height at the lateral frame root regions, the maximum height corresponding to the distance from the cover shell to the floor panel. At least one transversal beam is provided for each differential frame. Said at least one transversal beam bridges the entire variable-height portion of the lower section of the at least one differential frame and is attached at its both ends to the lower section of the corresponding differential frame.

The non-continuous lower section of the differential frame of the inventive fuselage airframe has a decreasing height that becomes smaller from respective left and right sides towards the aircraft's longitudinal symmetry axis until said lower section of the differential frame reaches at a lowest height a level which is essentially flush with an inner surface of the fuselage's lower concave cover shell. The portion of the lower section of the differential frame with the lowest height acts like an elastic hinge between the left and right sides of the lower section of the differential frame.

The transversal beam of the inventive fuselage airframe connects both the left and right side of the lower section of the differential frame at the height of the floor plane through respective hinged attachments. The differential frame with its V-shaped lower section and the transversal beam provide a differential frame-work structure capable of taking the structural duties of a conventional frame design with a continuous and constant height frame web. The transversal beam transfers corresponding cabin floor loads to the differential frame's left and right sides while the left and right portions of the differential frame are supported by the transversal beam for structural integrity within a crash scenario.

Since the bending stiffness about the longitudinal axis of the lower section of the differential frame at its lowest height is considerably less than its respective bending stiffness at floor panel level, i.e. the frame root regions, the fuel tank loads are mainly reacted at the frame root regions. Hence the left and right variable-height portions of the differential frame act as cantilevered beams hinged to one-another, clamped at the frame root regions and being laterally supported by the transversal beam. Each hinged attachment of the transversal beam to the differential frame is accomplished by means of a single bolt joint.

Preferably each transversal beam is attached to the differential frame at the lateral frame root regions—in case of an extension of the V-shaped variable height covering the whole fuselage width—or each transversal beam is attached to the inner flange of the frame and or the frame's web of the lower section of the differential frame—in case of a V-shape variable height of reduced extension. Since the attachment of the transversal beam is hinged, no bending moments are transferred from the transversal beam to the differential frame.

According to a preferred embodiment of the invention said beam attachment is a shear bolt connection. The installation of only two bolts using a metallic fitting allows for an easy tolerance and assembly management without the need of drill operations once fuel bladders have been installed. This allows as well a simple disassembly and removal of the fuel bladders from the subfloor compartment in case of repair.

According to a further preferred embodiment of the invention the bolt attachment of the transversal beam to the differential frame is arranged at the frame root regions of the differential frame, i.e. to its webs and/or to the inner flanges of the lateral frame portions or the lower frame section on the left hand and right hand side of the differential frame.

According to a further preferred embodiment of the invention the variable-height portion of the lower section of the differential frame covers the entire fuselage width less twice the width of the lateral frame portions at the frame root regions.

According to a further preferred embodiment of the invention the variable-height portion of the lower section of the differential frame covers 20% to 95% or preferably 20% to 80% of the fuselage width, the remaining web portion of the lower section being of full height and the transverse beam being attached to the web and/or inner flange of the lower frame section with full height According to a further preferred embodiment of the invention at least two additional joints are provided, connecting the transversal beam to variable-height portions of the lower section of the differential frame and hence forcing the transversal beam to carry to a certain extent the loads excited by a purely vertical crash.

The V-shaped lower section of the differential frame still features a concentration of material, i.e. a large web height, in the lateral regions where the energy dissipation is demanding. Said two additional joints prevent in case of an asymmetric loading an overstressing of the elastic hinge area at the lowest height of the differential frame in the middle of the lower cover and its subsequent premature fracture. The additional attachment points are allocated between the two outermost attachments of the transverse beam, symmetrically arranged with respect to the longitudinal axis, the distance between these two additional attachments covering 10% to 80% of the fuselage width at floor panel level.

Tension bolt joints are preferably used for the additional connection of the transverse beam to the lower section of the differential frame, taking advantage of the easy installation and the simple tolerance management, since the tension bolts do not have to be installed with a close fit. Said tension bolts are sufficient as additional attachment since the main loads are compression in a crash scenario, said main loads not being transferred by the tension bolt but by the contact area of the fitting to the transversal beam. Alternatively shear bolt connections can be provided.

According to a further preferred embodiment of the invention the minimum height of the web with the variable-height of the lower section of the differential frame is flush with the concave cover shell cross-section at the longitudinal axis.

According to another preferred embodiment of the invention a fuel tank for integration within the subfloor compartment of a fuselage airframe of a helicopter, comprises two fuel bladders connected by a middle bladder with a reduced cross section. Two single fuel bladders of one main fuel tank are physically connected to each other by the middle bladder hence eliminating the need of any associated interconnecting devices, such as pipes, pumps.

This translates to an increase of system robustness, less weight, reduced installation and assembly times, less access openings in the airframe structure for maintenance and increased crashworthiness of the inventive fuselage airframe.

The invention allows two adjacent fuel bladders of the inventive integrated fuel tank to extend longitudinally on two sides of the web with the variable-height of the lower section of the differential frame. Said two adjacent fuel bladders are integrally arranged for connection to each other by the middle bladder portion trespassing the lower section of the differential frame at positions with reduced height for fuel supply between both fuel bladders. The web of the lower section of the differential frame with reduced height is coincident with the middle portion between the fuel bladders of the integral fuel tank allowing to house the middle portion of the integral fuel tank within the airframe structure whilst ensuring both the differential frame's structural duties and an effective fuel tank integration during the final assembly line.

According to a further preferred embodiment of the invention a bottom part of the middle bladder is adapted to the V-shape of the lower section of at least one differential frame with the lowest level of the middle bladder being flush with the lowest level of the front fuel bladder and the rear fuel bladder for an obstruction free transfer of fuel in the fuel tank, hence allowing for an optimal fuel flow between these two connected fuel bladders.

According to a preferred embodiment of the invention a procedure for an integration of a fuel tank within the subfloor compartment of a fuselage airframe comprises the following steps:

Putting the fuel tank with two fuel bladders connected by a middle bladder with a reduced cross section from inside of the fuselage on a lower cover shell of the subfloor compartment between standard frames and with the reduced cross section of the middle bladder on the lower section of the differential frame at the web region with the variable-height, Attaching the transversal beam across the middle bladder and the differential frame by means of installing the bolts connecting the transverse beam to the differential frame, and Attaching the floor panels on top of the standard frames, and on top of the transversal beam of the differential frame with the fuel tank below.

The transverse beam is connected to the differential frame by means of the main bolts at both ends of the transverse beam and, if present, the additional bolts in the middle portion of the transverse beam. For a differential frame with reduced extension of the variable height region the floor panels can be additionally attached to the inner flange of the lower section of the differential frame.

The inventive fuel tank integration procedure is simply made from inside the fuselage with the fuselage lower cover shell as supporting structure. The frame's lower section with the variable-height of the differential frame in the lower portion of the inventive fuselage airframe allows the installation of one integral fuel tank with two fuel bladders into the subfloor compartment without requiring difficult and risky structural assembly steps once the integral fuel tank has been installed. In a preferred embodiment of the invention only two shear bolts (one per side) have to be installed in order to connect the transversal beam to the differential frame.

The bolts are preferably attached to the differential frame's web. In a further embodiment with improved crashworthiness only four bolts have to be installed in order to connect the transversal beam to the differential frame. Loads in the critical frame root region, i.e. in the critical area of the lower frame portion, are estimated to be only about 50% larger in comparison to a standard frame with one continuous web height below the floor plane. Due to smoothened trajectories of respective inner flange of the differential frame however, the consequences of these larger loads in terms of ultimate strength capabilities of the critical frame root are alleviated to a considerable extent.

The web of the lower section with the variable-heights of the differential frames and the corresponding middle bladder portions act as slosh walls to dampen any dynamic movement of the fuel between the fuel bladders.

BRIEF DESCRIPTION OF THE SEVERAL VIEWS OF THE DRAWINGS

Preferred embodiments of the invention are described with reference to the following description and drawings.

DETAILED DESCRIPTION OF THE INVENTION

Figure 1:
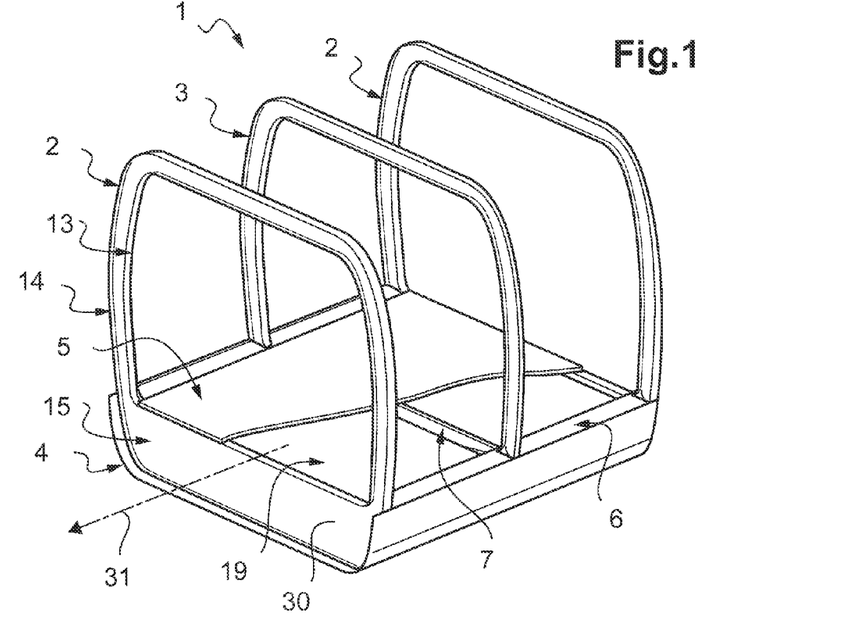
FIG. 1 shows an overall perspective view of a helicopter's fuselage airframe according to the invention.

According to FIG. 1 a central fuselage airframe 1 of a heavy helicopter (not shown) is composed of standard frames 2 and a differential frame 3 with a multipart design. The standard and differential frames 2, 3 enclose the whole perimeter on a concave side of a carrying subfloor compartment 30 of the fuselage airframe 1. The standard and differential frames 2, 3 are essentially perpendicular to a longitudinal helicopter axis 31 and essentially parallel to a Z-axis 18 (see FIG. 5).

The standard frames 2 and the differential frame 3 are provided respectively with a web 15, an inner flange 13 extending along the inner contour perimeter of the web and an outer flange 14 extending along an outer contour perimeter of the web. A cover shell 4 closes the bottom of the carrying subfloor compartment 30 and is concave towards a floor panel 5 along the respective outer caps 14 of the frames 2 and 3.

A fuel tank 19 is integrated between the lower cover shell 4, the floor panel 5 and floor side panels 6 on top of both sides of the concave cover shell 4. The differential frame 3 is allocated between two standard frames 2. A transversal beam 7 extends between both sides of the concave cover shell 4 above the fuel tank 19 and above the V-shaped web shell of a lower section 8 (see FIG. 3) of the differential frame 3. The standard frames 2 have a lower section 8 with a frame web 15 below the floor plane with a full web height, i.e. with a web-height extending from the concave cover shell 4 to the floor panel 5. An upper section 9 (see FIG. 3) of the frames 2, 3 with lateral portions above the floor panel 5 might be in two parts riveted to each other.

Figure 2:
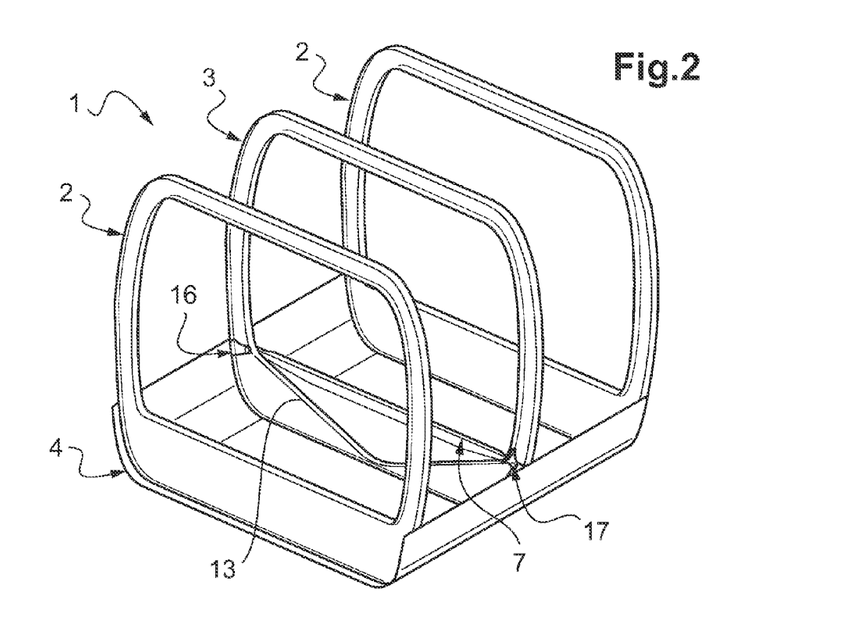
FIG. 2 shows another overall perspective view of the helicopter's fuselage airframe according to the invention.

According to FIG. 2 corresponding features are referred to with the references of FIG. 1. The lower section 8 of the differential frame 3 between the standard frames 2 is provided with a V-shape with the lowest point in the middle of the concave cover shell 4 and the highest points laterally at the respective left hand and right hand sides of the differential frame 3 at the transition from the frame's lower section 8 below the floor plane 5 to the upper section 9 of the differential frame 3 above the floor plane 5. A trajectory of the inner flange 13 along an upper contour perimeter of the variable height web 15 of the lower section 8 of the differential frame 3 is straight between a lowest point in the middle of the concave cover shell 4 and highest points at the lateral portions. The transversal beam 7 is attached to the differential frame 3 at floor level at the lateral portions by means of joints of shear bolts 17 and metallic fittings 16. The transversal beam 7 is parallel to the differential frame 3.

Figure 3:
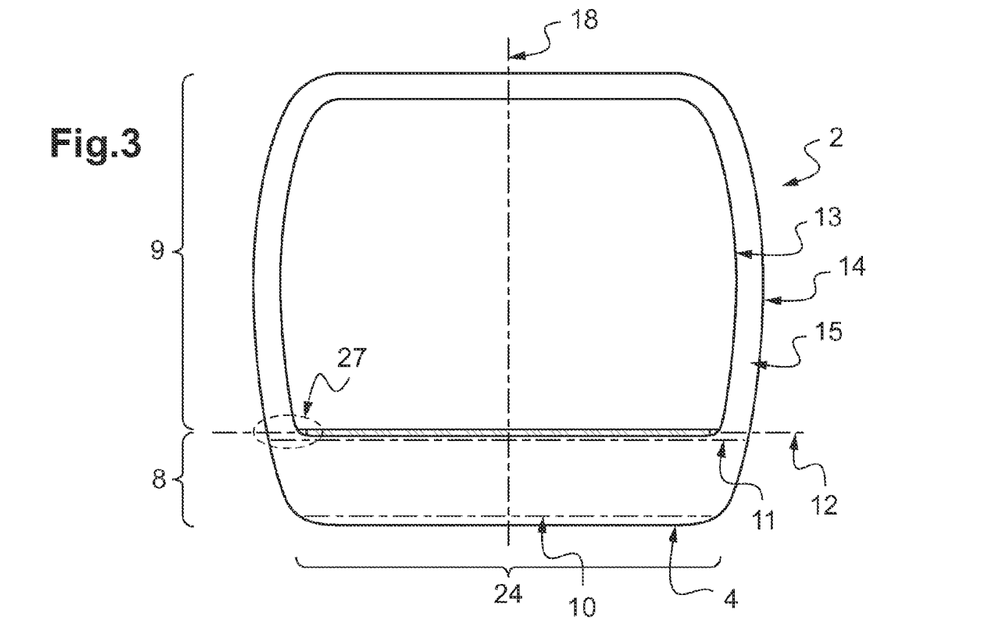
FIG. 3 shows a frontal view of a standard frame of the helicopter's fuselage airframe according to the invention.

According to FIG. 3 corresponding features are referred to with the references of FIGS. 1, 2. The standard frame 2 is composed of the frame web 15 with its inner flange 13 and the outer flange 14. The outer flange 14 defines the outer perimeter of the load carrying fuselage airframe 1. The upper section 9 of the frame web 15 is allocated above a floor plane 12 provided by the floor panel 5. The lower section 8 of the frame web 15 is allocated below the floor plane 12. The floor panel 5 is placed on top of the inner flange 13 within the lower section 8 of the frame web 15. The transition of the frame web 15 from the upper section 9 to the lower section 8 is the respective frame root 27 with an inner flange 13 that makes a sharp and localized trajectory deviation within the frame root region 27, resulting in a structurally weak region.

The frame web 15 at the frame's lower section 8 has a full height along the entire width 24 of the subfloor compartment 30 between the lower cover shell 4 and the floor panel 5 almost entirely on level for a fuel tank's perimeter 11. A lower surface 10 of the fuel tank 19 rests on top of an inner surface of the concave cover shell 4 covered with foam elements (not shown). The standard frame 2 is essentially symmetric with respect to a vertical axis 18 perpendicular to the longitudinal helicopter axis 31.

Figure 4:
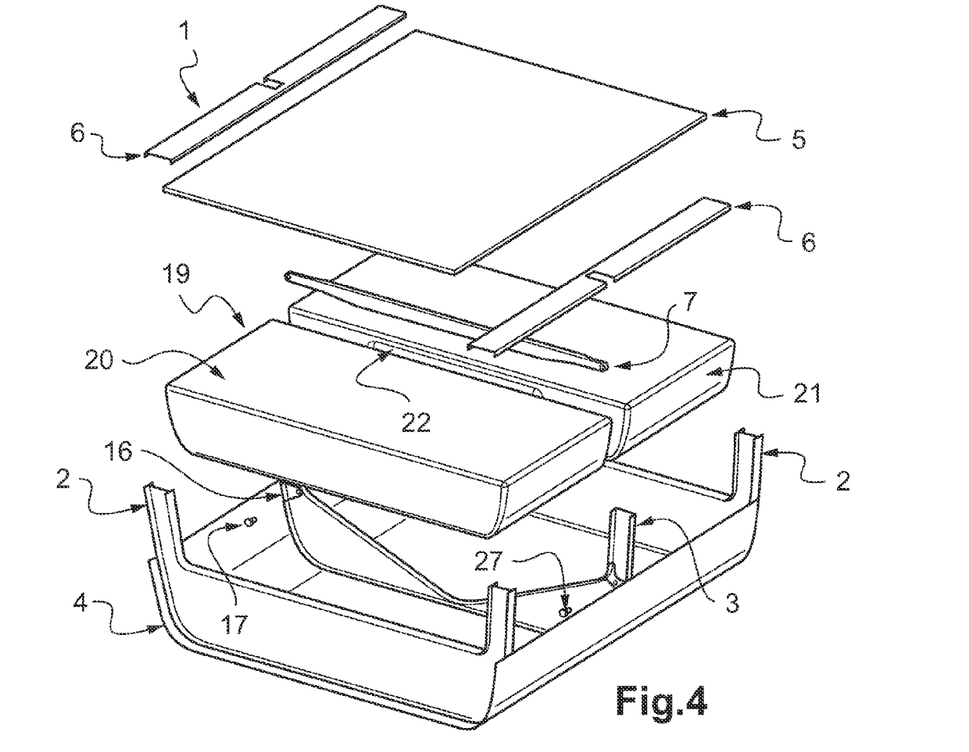
FIG. 4 shows an exploded view of an essentially lower part of the helicopter's fuselage airframe according to the invention.

According to FIG. 4 corresponding features are referred to with the references of FIGS. 1-3. For the sequence of the assembly of the fuel tank 19 into the fuselage airframe 1 in a first step the integral fuel tank 19 is lowered onto the lower sections 8 of the parallel standard frames 2 and the differential frame 3 and the lower cover shell 4. Subsequently the transversal beam 7 is attached at its both lateral ends to the root regions 27 of the differential frame 3 by installing the joints with the shear bolts 17. The floor panel 5 and the side floor panels 6 are mounted above the integral fuel tank 19 onto upper caps of the lower section 8 of the standard frames 2 and the transverse beams 7. The fuel tank 19 features a forward fuel bladder 20 and a rear fuel bladder 21, interconnected to each other by a middle bladder portion 22 with a reduced cross section parallel to the differential frame 3. The fuel bladders 20, 21 and the middle bladder 22 compose the fuel tank 19, with the middle bladder 22 allowing for fuel transfer between both fuel bladders 20, 21.

Figure 5:
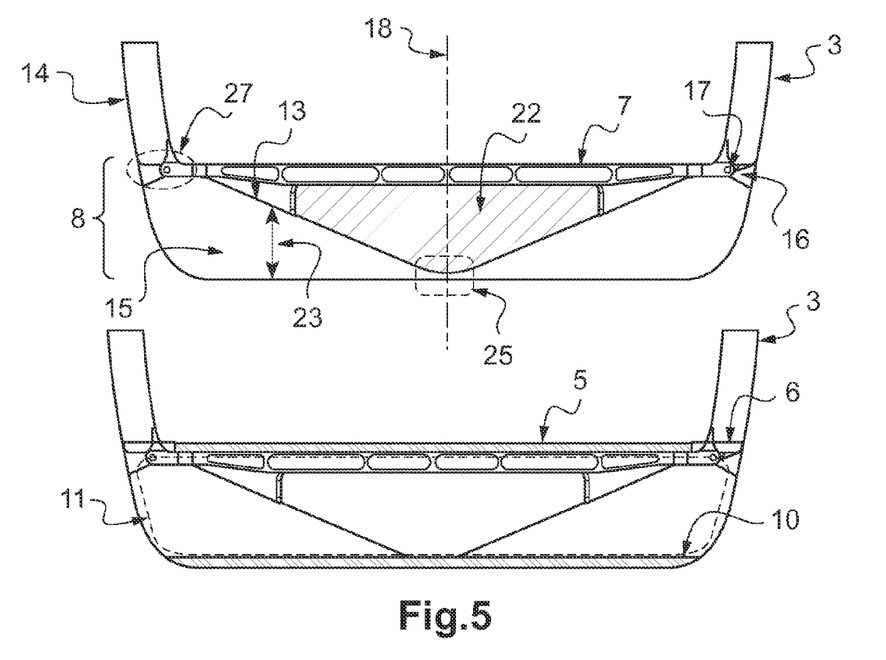
FIG. 5 shows two cross sectional views of the helicopter's fuselage airframe according to the invention.

According to FIG. 5 corresponding features are referred to with the references of FIGS. 1-4. The differential frame 3 in the frame's lower section 8 has a linear variable height 23 along its extension, with maximum heights at the lateral frame root regions 27 and a minimum height at the middle portion at the Z-axis 18=symmetry axis for the fuselage airframe 1. The minimum height is at least 5 times less than the maximum height. The differential frame 3 with its minimum height at the middle portion provides a type of an elastic hinge 25 at the symmetry axis of the fuselage airframe 1. The differential frame 3 with its linear variable height 23 provides a smooth transition of the web 15 at the inner flange 13 from the upper section 9 to the lower section 8 at the respective frame root regions 27, providing a smooth localized trajectory deviation within the frame root regions 27 partially compensating the impact of the larger loads on the load bearing capabilities of the frame root regions 27.

The transversal beam 7 is attached to the variable height web 15 of the differential frame 3 at its lateral frame root regions 27 by means of a metallic fitting 16 and a shear bolt 17 at each side. The distance between the transversal beam 7 and the V-shaped web 15 of the lower section 8 of the differential frame 3 is sufficient for the installation of the middle bladder 22 with its reduced cross section below the transversal beam 7. The minimum height of the variable height web 15 of the lower section 8 of the differential frame 3 corresponds to the lowest level of the middle bladder 22 for fuel transfer without obstruction between both front and rear fuel bladders 20, 21 with respective outer perimeters 11 between the standard frames 2 and the differential frame 3.

Figure 6:
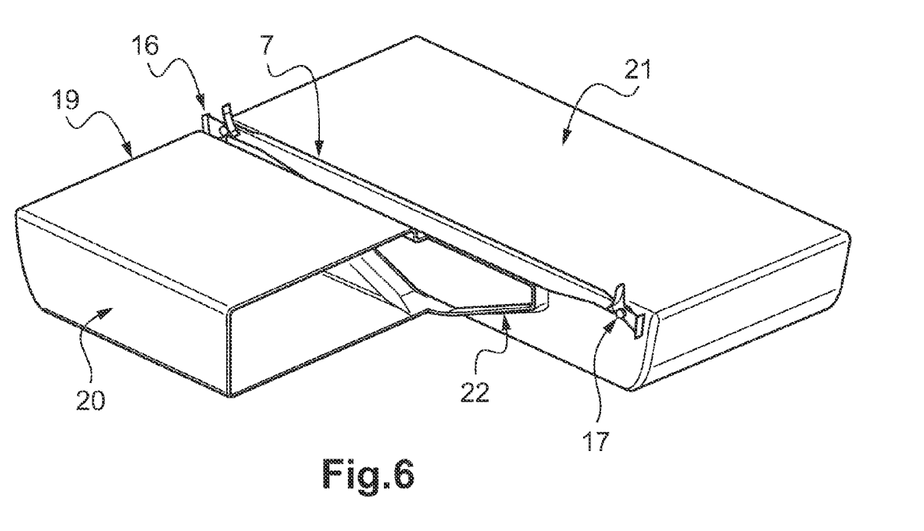
FIG. 6 shows a perspective view of a partly cut fuel tank according to the invention.

According to FIG. 6 corresponding features are referred to with the references of FIGS. 1-5. The integral fuel tank 19 with its front fuel bladder 20 and its rear fuel bladder 21 is interconnected by the middle bladder 22. A bottom part of the middle bladder 22 is adapted to the V-shape of the differential frame 3 with the lowest level of the middle bladder 22 being flush with the lowest level 10 of the front fuel bladder 20 and the rear fuel bladder 21. The transversal beam 7 mounted by means of the respective joints of metallic fittings 16 and shear bolts 17 to the respective frame roots 27 passes on top of the reduced cross section of the middle bladder 22 between the front fuel bladder 20 and the rear fuel bladder 21.

Figure 7:
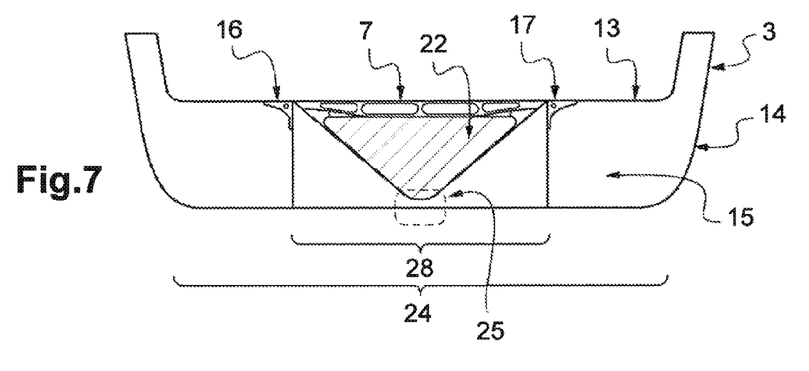
FIG. 7 shows a cross sectional view of another helicopter's fuselage airframe according to the invention.

According to FIG. 7 corresponding features are referred to with the references of FIGS. 1-6. The V-shape of the differential frame 3 is symmetric with regard to the symmetry axis for the fuselage airframe 1 and does not cover the entire but a reduced portion 28 of the width 24 with the elastic hinge 25, while along the remaining portion of the entire width 24 the web height of the differential frame 3 is full. The transversal beam 7 has a reduced length only covering the V-shaped region of the lower section 8 of the differential frame 3 being hence attached by means of the respective joints of metallic fittings 16 and shear bolts 17 to the upper part of the lower section 8 of the differential frame 3 at the transition from constant height to variable-height. The transversal beam 7 is connected symmetrical with regard to the symmetry axis 18 for the fuselage airframe 1 to the inner flange 13 and/or the web 15. The reduced cross section of the middle bladder 22 is installed between the transversal beam 7 and the V-shaped region of the lower section 8 of the differential frame 3.

Figure 8:
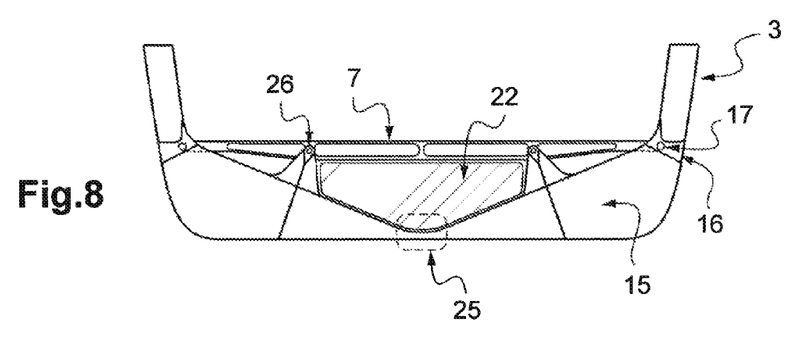
FIG. 8 shows a cross sectional view of still another helicopter's fuselage airframe according to the invention.

According to FIG. 8 corresponding features are referred to with the references of FIGS. 1-7. The V-shape of the differential frame 3 is symmetric with regard to the symmetry axis 18 for the fuselage airframe 1 and extends along the entire fuselage width 24 less the width of the lateral frame portions. The transversal beam 7 is supported symmetrical with regard to the symmetry axis for the fuselage airframe 1 by two additional shear bolt connections at the lower section 8 of the differential frame 3 between the respective joints of metallic fittings 16/shear bolts 17 and the minimum height of the differential frame 3, thus allowing alleviation of stress levels at the elastic hinge 25 under asymmetrical load conditions and improving the crash behavior of the differential frame 3. The middle bladder 22 is housed between the additional shear attachments 26.

Figure 9:
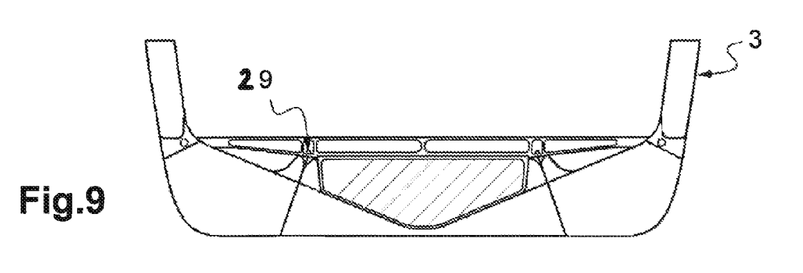
FIG. 9 shows a cross sectional view of a further helicopter's fuselage airframe according to the invention.

According to FIG. 9 corresponding features are referred to with the references of FIGS. 1-8. The transversal beam 7 is additionally attached symmetrical with regard to the symmetry axis for the fuselage airframe 1 by two additional tension attachments 29 with bolt fittings at the web 15 of the lower section 8 of the differential frame 3 between the respective joints of metallic fittings 16/shear bolts 17 and the minimum height of the lower section 8 of the differential frame 3. As in case of a crash of the helicopter the driving loads on the additional attachments of the transversal beam 7 to the differential frame 3 are mainly compressive, there is no need for connections by means of joints with shear bolts 17. The additional tension attachments 29 with bolt fittings simplify the installation and fixation and the tolerance management, since the tension bolt fittings do not require a close fit contrary to the shear bolt connections. The load in compression is not transferred by the tension bolt but by the contact area of its attachment's fitting to the transversal beam 7.

REFERENCE CHARACTERS

1. Fuselage airframe
2. Standard frame
3. Differential frame
4. Concave cover shell
5. Floor panel
6. Floor side panels
7. Transversal beam
8. Frame lower section
9. Frame upper section
10. Lower tank surface
11. Bladder perimeter
12. Floor plane
13. Inner flange
14. Outer flange
15. Web
16. Fitting
17. Bolt
18. Z-Axis
19. Integral fuel tank
20. Front bladder
21. Rear bladder
22. Middle bladder
23. Frame web height
24. Fuselage width
25. Elastic hinge
26. Additional bolt
27. Frame root region
28. Reduced V-Shape extension
29. Tension bolt joint
30. Subfloor compartment
31. Longitudinal axis

What is claimed is:

1. A fuselage airframe of a helicopter comprising a subfloor compartment for a fuel tank, encompassed by a concave cover shell, standard frames and a floor panel covering the subfloor compartment above the concave cover shell, wherein at least one differential frame is mounted to the concave cover shell, the at least one differential frame being perpendicular and symmetric with regard to a longitudinal axis and having an upper section above the floor panel and a lower section below the floor panel and respectively lateral frame root regions merging the upper and lower sections, the at least one differential frame partitioning the subfloor compartment between the standard frames, wherein the lower section of the at least one differential frame has a web with variable-heights with respect to the cover shell between a minimum height at the longitudinal axis and a maximum height at the lateral frame root regions, and wherein at least one transversal beam is provided, bridging the entire web portion of the lower section with the variable-height of the at least one differential frame and being hingedly attached at its both lateral ends to the lower section of the at least one differential frame by means of at least one bolt.

2. The airframe according to claim 1, wherein the at least one bolt is a shear bolt.

3. The airframe according to claim 1, wherein the portion of the web of the lower section with variable-height of the at least one differential frame covers the fuselage width less the width of the lateral frame portions a floor plane level.

4. The airframe according to claim 3, wherein the portion of the web of the lower section with variable-height of the at least one differential frame covers 20% to 80% of the fuselage width.

5. The airframe according to claim 1, wherein at least two additional shear or tension attachments are provided between respective metallic fitting shear bolt joints, connecting the at least one transversal beam to the lower section with variable-height of the at least one differential frame.

6. The airframe according to claim 1, wherein the minimum height of the lower section of the at least one differential frame is flush with an inner surface of the concave cover shell at the longitudinal axis.

7. A fuel tank for integration within the subfloor compartment of a fuselage airframe of a helicopter airframe according to claim 1, wherein the fuel tank comprises at least one front fuel bladder and at least one rear fuel bladder connected by a middle bladder with a reduced cross section relative to the at least one front fuel bladder and/or the at least one rear fuel bladder, wherein a bottom part of the middle bladder is adapted to a V-shape of the web of the lower section of the at least one differential frame, covering an opening between the web with variable height and the transverse beam with a lowest level of the middle bladder being flush with a lowest level of the front fuel bladder and the rear fuel bladder.

8. A procedure for an integration of the fuel tank within the subfloor compartment of the fuselage airframe according to claim 1, the procedure having the following steps:

putting the fuel tank with two fuel bladders connected by a middle bladder with a reduced cross section from inside of the fuselage airframe on the concave cover shell of the subfloor compartment between the standard frames and with the reduced cross section of the middle bladder on the web with variable-heights of the differential frame;

attaching the transversal beam across the middle bladder and the differential frame by means of installing the at least one bolt; and attaching the floor panel on top of the standard frames, the web with variable-heights of the differential frame and on top of the transversal beam with the fuel tank below.

9. A fuselage airframe of a helicopter comprising a subfloor compartment for a fuel tank, the subfloor compartment comprising a concave cover shell, first frames, a floor panel disposed above the subfloor compartment and the concave cover shell, and a second frame mounted to the concave cover shell, the second frame being perpendicular and symmetric with regard to a longitudinal axis and having an upper section above the floor panel and a lower section below the floor panel and respectively lateral frame root regions merging the upper and lower sections, the second frame partitioning the subfloor compartment between the first frames, the lower section of the second frame having a web with variable-heights with respect to the cover shell between a minimum height at the longitudinal axis and a maximum height at the lateral frame root regions, and the air frame further comprising a transversal beam bridging the entire web portion of the lower section with the variable-height of the at least one differential frame and being hingedly attached at both lateral ends to the lower section of the at least one differential frame.

10. The airframe according to claim 9, wherein the transversal beam is hingedly attached to the differential frame by at least one bolt.

11. The airframe according to claim 10, wherein the at least one bolt is a shear bolt.

12. The airframe according to claim 9, wherein the portion of the web of the lower section with variable-height of the second frame covers the fuselage width less the width of the lateral frame portions at a floor plane level.

13. The airframe according to claim 12, wherein the portion of the web of the lower section with variable-height of the second frame covers 20% to 80% of the fuselage width.

14. The airframe according to claim 9, wherein at least two additional shear or tension attachments are provided between respective metallic fitting shear bolt joints, connecting the transversal beam to the lower section with variable-height of the second frame.

15. The airframe according to claim 9, wherein the minimum height of the lower section of the second frame is flush with an inner surface of the concave cover shell at the longitudinal axis.

* * * * *